United States Patent [19]
Rust et al.

[11] Patent Number: 5,699,530
[45] Date of Patent: Dec. 16, 1997

[54] CIRCULAR RAM-BASED FIRST-IN/FIRST-OUT BUFFER EMPLOYING INTERLEAVED STORAGE LOCATIONS AND CROSS POINTERS

[75] Inventors: Camron Boyd Rust, Hillsboro; Manpreet S. Khaira; Thomas P. Thomas, both of Beaverton; David Finan, Portland, all of Oreg.

[73] Assignee: Intel Corporation, Santa Clara, Calif.

[21] Appl. No.: 538,470

[22] Filed: Oct. 3, 1995

[51] Int. Cl.$^6$ ............................ G11C 7/00; G11C 13/00
[52] U.S. Cl. .................. 395/250; 395/476; 365/189.02; 365/189.04
[58] Field of Search .................................. 395/250, 432, 395/454, 465, 469, 476, 477, 484, 871; 365/189.01, 189.02, 189.05, 189.08, 189.04, 189.09, 189.07

[56] References Cited

U.S. PATENT DOCUMENTS

| | | | |
|---|---|---|---|
| 4,602,353 | 7/1986 | Wawersig et al. | 365/189.05 |
| 4,660,177 | 4/1987 | O'Connor | 365/156 |
| 4,823,321 | 4/1989 | Aoyama | 395/189.04 |
| 4,954,987 | 9/1990 | Auvinen et al. | 365/189.02 |
| 4,998,221 | 3/1991 | Correale, Jr. | 365/189.07 |
| 5,276,842 | 1/1994 | Sugita | 395/476 |
| 5,321,652 | 6/1994 | Ito | 395/189.07 |
| 5,546,569 | 8/1996 | Proebsting et al. | 395/559 |
| 5,568,443 | 10/1996 | Dixon et al. | 365/230.05 |

*Primary Examiner*—Parshotam S. Lall
*Assistant Examiner*—Viet Vu
*Attorney, Agent, or Firm*—Blakely, Sokoloff, Taylor & Zafman

[57] ABSTRACT

The first-in/first-out (FIFO) buffer includes a first bank of individual storage elements for storing even data and a second bank of individual storage locations for storing odd data. Precharge elements are provided for precharging the even array while data is read from the odd array during one clock cycle and for precharging the odd array while data is read from the even array during a next subsequent clock cycle. Hence, only half of the array is precharged during any one clock cycle. The FIFO buffer is driven by a clock signal having a clock period equal to a minimum precharge time. A 3-input multiplexer is provided with 3 inputs connected, respectively, to an output line of the even array, an output line of the odd array, and an overall input line. In circumstances where data needs to be written to and read from the same storage element in one clock cycle, the multiplexer selects the input line thereby allowing the input data to bypass the storage array for immediate output. The FIFO buffer includes a FIFO read pointer circuit and a FIFO write pointer circuit, each configured as a matrix of individual 2-input AND gates. Each of the gates of the read pointer circuit are connected to a pair of linear feedback shift registers which operate to enable only one of the gates during any clock cycle for selecting only one of the storage locations for reading a bit from. The write pointer circuit has a similar configuration. Alternative embodiments are described wherein the FIFO buffer includes rows split into three or more sub-rows, rather than merely a pair of even and odd rows.

15 Claims, 7 Drawing Sheets

CIRCULAR RAM-BASED FIRST-IN/FIRST-OUT BUFFER EMPLOYING INTERLEAVED STORAGE LOCATIONS AND CROSS POINTERS

BACKGROUND OF THE INVENTION

1. Field of the Invention

The invention generally relates to computer systems and in particular to a first-in/first-out (FIFO) buffer for use within a computer system.

2. Description of Related Art

FIFO buffers are commonly employed in computer systems and other data processing equipment for temporarily storing or buffering data, particularly, for input or output purposes. Typically, a portion of random access memory (RAM) is employed to implement the FIFO buffer. An example of such a RAM-based FIFO buffer is set forth in FIG. 1. FIFO buffer 10 of FIG. 1 includes a RAM array 12 and a pointer or selection element 14. RAM array 12 includes a matrix of individual bit storage location arrange in rows and columns. Each column stores the bits corresponding to one data unit, such as byte or a word. (As a matter of nomenclature, in some systems, a "row" is regarded as storing all bits corresponding to one data unit. Herein, however, the term "column" will be used.) If implemented with N rows of M columns, the RAM array is capable of storing or buffering N units of data each having M bits.

On any clock cycle, one data unit may be stored or input to the RAM array while one data unit is output. The pointer device 14 controls or specifies a column into which input data is stored and a, possibly different, column from which output data is read. Typically, the pointer device operates as circular pointer to sequentially increment the column locations during each clock cycle such that data units are input and output in a first-in/first-out manner.

FIG. 2 illustrates one row of the individual bit storage locations of RAM array 12. More specifically, FIG. 2 illustrates a row 16 of individual storage elements 18, which each may be a latch, interconnected between an input line 20 and an output line 22 having a sense amplifier 23. Input data is driven onto input line 20 by a large inverter 24. Individual bits to the output are driven by a relatively small inverter 26 connected to each individual storage location 18. Furthermore, each individual storage location includes an input pass transistor 28 and output pass transistor 30. Gates of the input and output transistors are connected to the pointer device and, in any one clock cycle, only one of the input transistors receives an enabling signal and only one of the output transistors receives an enabling signal. In this manner, only one of the storage location receives an input bit and only one of the storage locations outputs a bit within any given clock cycle. One of the disadvantages of the arrangement is that the pointer device cannot select the same storage location for both writing to and reading from within the same clock cycle. Rather, each bit of data must reside within one of the storage locations for at least one clock cycle.

Another disadvantage of the arrangement is that output line 22 must be precharged, by a precharge unit 30 within each clock cycle before a data bit can be read from a selected storage location. Accordingly, the first half of each dock cycle is devoted to precharge. The second half of each clock cycle is devoted to output. Reading, however, requires a minimum amount of time, thereby limiting the overall clock rate. Yet another disadvantage of the arrangement is that each individual output amplifier 26 must be capable of driving the output line 22 resulting in fairly significant power requirements during each clock cycle. Also, the need to provide a separate output driver or transistor for each storage location results in an overall FIFO circuit requiring considerable silicon area.

FIG. 3 illustrates a typical pointer device 32 for use in generating read pointer signals for selecting one of the bit locations of array to output a bit. A similar arrangement is provided for providing selection signals to select one of the bits for writing a bit into. More specifically, read pointer device 32 includes a state machine 34, which may be a rudimentary linear feedback shift register (LFSR) and a set of selection gates 36 each receiving six input signals and generating one output signal along a selection line 38. One such selection line 38 is connected to each of the read transistors 28 of each of the rows of storage locations. To convert the six input signals to a single selection signal, each gate includes a pair of 3-input NAND gates 40 connected through a 2-input NAND gate 42 to an inverter 44. Hence, each set of selection signals output by the state machine must propagate through a fairly complicated set of gates before being driven by inverter 44 onto selection line 38. The need to propagate the signals through a fairly complicated logic gate can result in significant overall propagation time from the state machine to the read transistor of the selected storage location. Such can diminish the overall performance of the RAM FIFO, particularly, for FIFOs having a large number of rows of storage elements.

It would be desirable to provide an improved RAM-based FIFO buffer which overcomes the aforementioned disadvantages and it is to those ends that aspects of the present invention are drawn.

SUMMARY OF THE INVENTION

In accordance with the invention, a scalable split-RAM circular FIFO using cross-pointers is provided. In an exemplary embodiment, the FIFO includes a first bank of individual storage elements for storing even data and a second bank of individual storage locations for storing odd data. Means are provided for precharging the even array while reading data from the odd array during one clock cycle and for precharging the odd array while reading from the even array during the next subsequent clock cycle. Hence, only half of the array is precharged during any one clock cycle. Hence, the overall clock rate may be set to provide a clock period equal to the minimum read time, rather than a clock period equal to twice the minimum read time as with some conventional arrangements. Thus, the overall clock rate is effectively doubled. In other embodiments, the RAM array is split into three or more sub-arrays allowing even higher clock rates.

In the exemplary embodiment, a 3-input multiplexer is provided with the three inputs connected, respectively, to an output line of the even array, an output line of the odd array, and an overall input line. In circumstances where data needs to be written to and read from the same storage element in one clock cycle, the multiplexer selects the input line thereby allowing the input data to bypass the storage array for immediate output. Hence, a one clock cycle delay of conventional RAM-FIFOs occurring when writing to and reading from a single storage location is avoided.

Also, in the exemplary embodiment, each of the storage locations of the even array are connected through corresponding write transistors to an output line having a single sense amplifier. The storage elements of the odd array are configured in the same manner. Hence, two output sense amplifiers are provided rather than one amplifier per column as with conventional RAM FIFOs. By dividing the storage elements across two read lines each sees a greatly reduced load and will operate faster. Also, the total silicon area required is minimized and the overall power consumed is reduced. The sense amplifier is preferably a static sense amplifier such as a skewed trip point CMOS inverter.

Also in the exemplary embodiment, a FIFO read pointer circuit is provided, for use with a storage array having N storage columns, wherein the pointer circuit includes a first $\sqrt{N}$-bit shift register, a second $\sqrt{N}$-bit shift register and an $\sqrt{N}$ by $\sqrt{N}$ array of 2-input AND gates interconnected to individual elements of the first and second shift registers. Output lines from the 2-input AND gates are connected to the read transistors of each of the storage elements of the array. A similar matrix configuration is provided for generating write pointers. With this configuration, each selection gate requires only a 2-input AND gate, rather than the more complicated 6-input multiple-gate arrangement of systems of the prior art. Accordingly, propagation time of selection signals from the LFSRs to the actual storage locations is fairly minimal, which is particularly advantageous when employed with storage arrays having a large number of rows.

In alternative embodiments, the pointer matrix array may be employed for use with M row storage array merely by adding or removing additional rows or columns of the 2-input AND gates, along with the appropriate modifications to the LFSRs. Hence, no substantial redesigning of the pointers is required to accommodate an M row array instead of an N row array. Within a small range, little re-design is required to the other elements of the circuit.

Thus, each of the various disadvantages of the conventional RAM-based circular FIFOs of the prior art, discussed above, are substantially overcome. Other advantages and features of the invention will be apparent from the detailed description which follows and from the drawings attached hereto.

DETAILED DESCRIPTION OF EXEMPLARY EMBODIMENTS OF THE INVENTION

Referring to FIGS. 4–11, exemplary embodiments of the invention will now be described. The exemplary embodiments will primarily be described with reference to block diagrams and circuit schematics illustrating important components of the invention. A practical system may require additional components not described and illustrated herein. The additional components are not described and illustrated because those components are not necessary for an understanding of the principles of the invention. Moreover, the internal configuration or fabrication of the various components described herein will not be typically be set forth, as such components can be configured and fabricated in accordance with conventional techniques or in accordance with the overall teachings of the invention provided herein.

Figure 1:
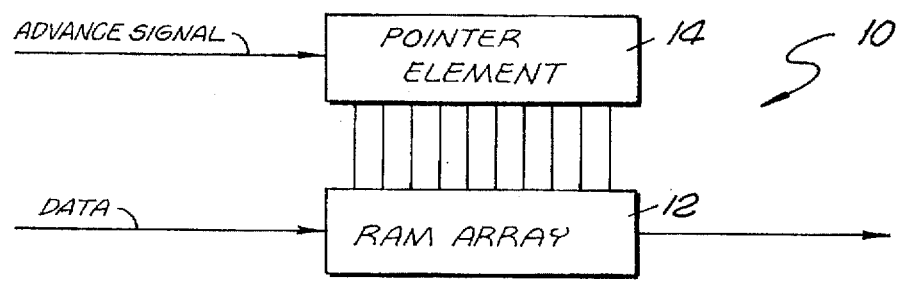
FIG. 1 is a block diagram of a circular RAM-based FIFO buffer of the prior art.
Figure 2:
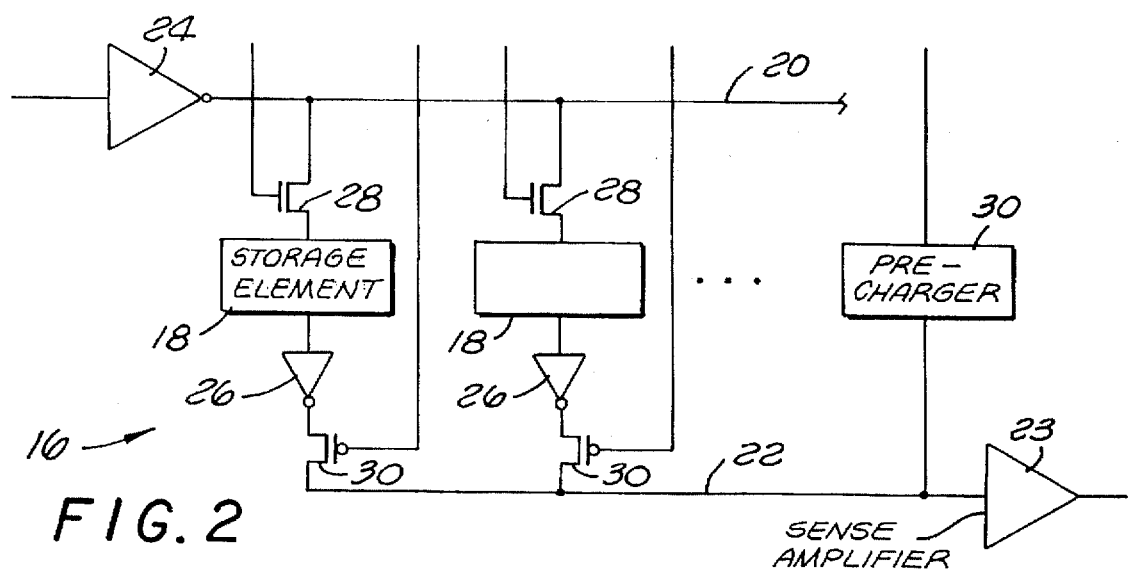
FIG. 2 is circuit schematic illustrating one row of a storage array of the FIFO buffer of FIG. 1.
Figure 3:
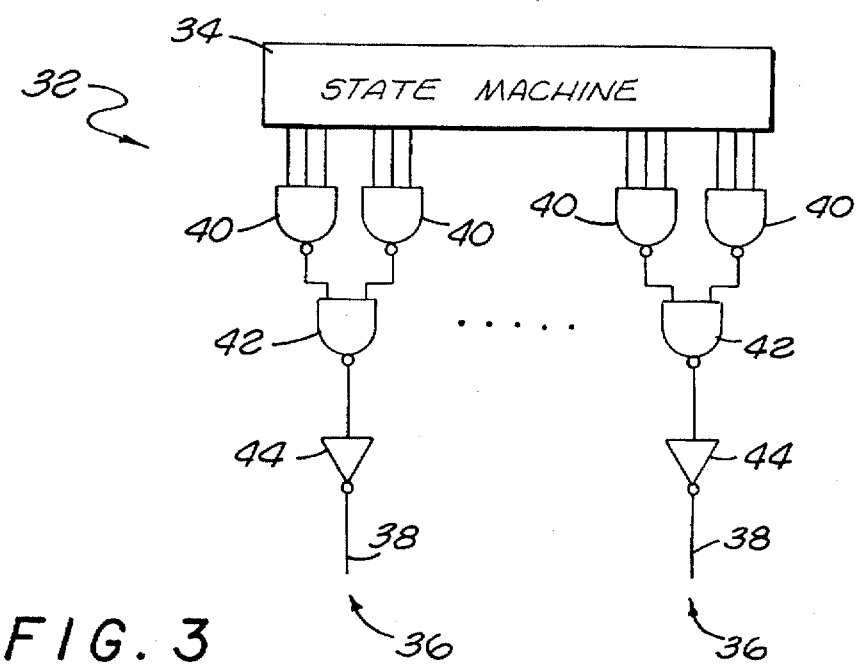
FIG. 3 is a schematic representation of a portion of an array pointer of the FIFO buffer of FIG. 1.
Figure 4:
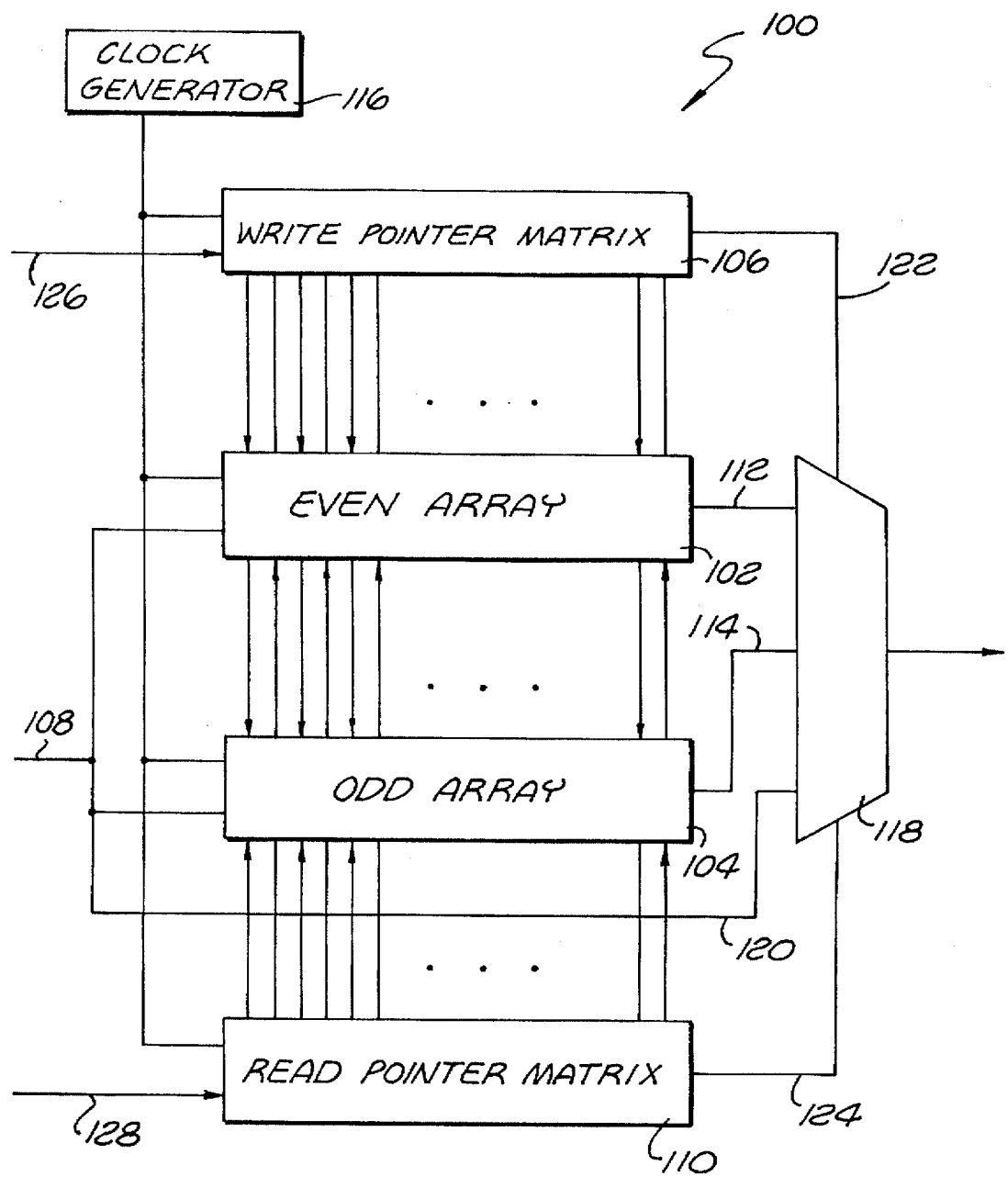
FIG. 4 is a block diagram of a split-RAM circular FIFO buffer configured in accordance with a first exemplary embodiment of the invention.

FIG. 4 illustrates a split-RAM circular FIFO buffer 100 having N rows of bit-storage elements each split into an even row within an even array 102 and an odd row within an odd array 104. A write pointer matrix 106 is connected to each of the individual elements of the even and odd arrays for selecting one element of the row to receive an input bit provided along an input line 108. Likewise, a read pointer matrix 110 is connected to each of the elements of the even and odd arrays for selecting one of the elements to output a bit along output lines 112 and 114.

The read and write pointer matrices and the even and odd arrays are each synchronized to a single clock signal provided by a clock generator 116. In any one clock cycle, one storage location is selected to receive a bit and one storage location is selected to output a bit. A multiplexer 118 is connected to output line 112 and 114 for selecting the output from either even array 102 or odd array 104 depending upon the storage location selected for outputting. Multiplexer 118 also receives the input signal directly along line 120 which is connected to input line 108. If the same storage location is specified for both reading and writing within the same clock cycle, then the multiplexer selects input from line 120 to thereby output the signal immediately, without any delay caused by first writing the data to a storage location, then reading the data from that location on a subsequent clock cycle. To determine whether the same storage location is selected for both reading and writing, multiplexer 118 receives appropriate signals from both the write pointer matrix and the read pointer matrix along lines 122 and 124, respectively.

Both the even and odd arrays include a precharge element (not separately shown in FIG. 4), connected to the corresponding output line, for precharging the output line prior to a read operation. In any one clock cycle, either the output line of the even array is precharged and data is output from the odd array, or the output line of the odd array is precharged and data is output from the even array. The clock rate of the clock signal provided by clock generator 116 is selected to provide a clock period about equal to the minimum necessary read time. Hence, if the minimum necessary read time is five nanoseconds, the period that the clock signal is set to five nanoseconds, yielding a clock rate of about 200 MHz. This assumes that the data to be output from the arrays is interleaved such that it can be output from the even and odd arrays alternately as is the case in FIFO usage. If however, consecutive bits of data must be read from the even array, some delay will be required to allow the output line of the even array to be precharged after each of the consecutive bits is output.

Within each clock cycle, the specific storage location to be written to and the specific storage location to be read from are specified by a write advance signal and read advance signal received along lines 126 and 128, respectively, by the write pointer matrix and the read pointer matrix. Both pointer matrices are configured to increment the address pointer specifying the storage location upon the reception of an appropriate advance signal.

Figure 5:
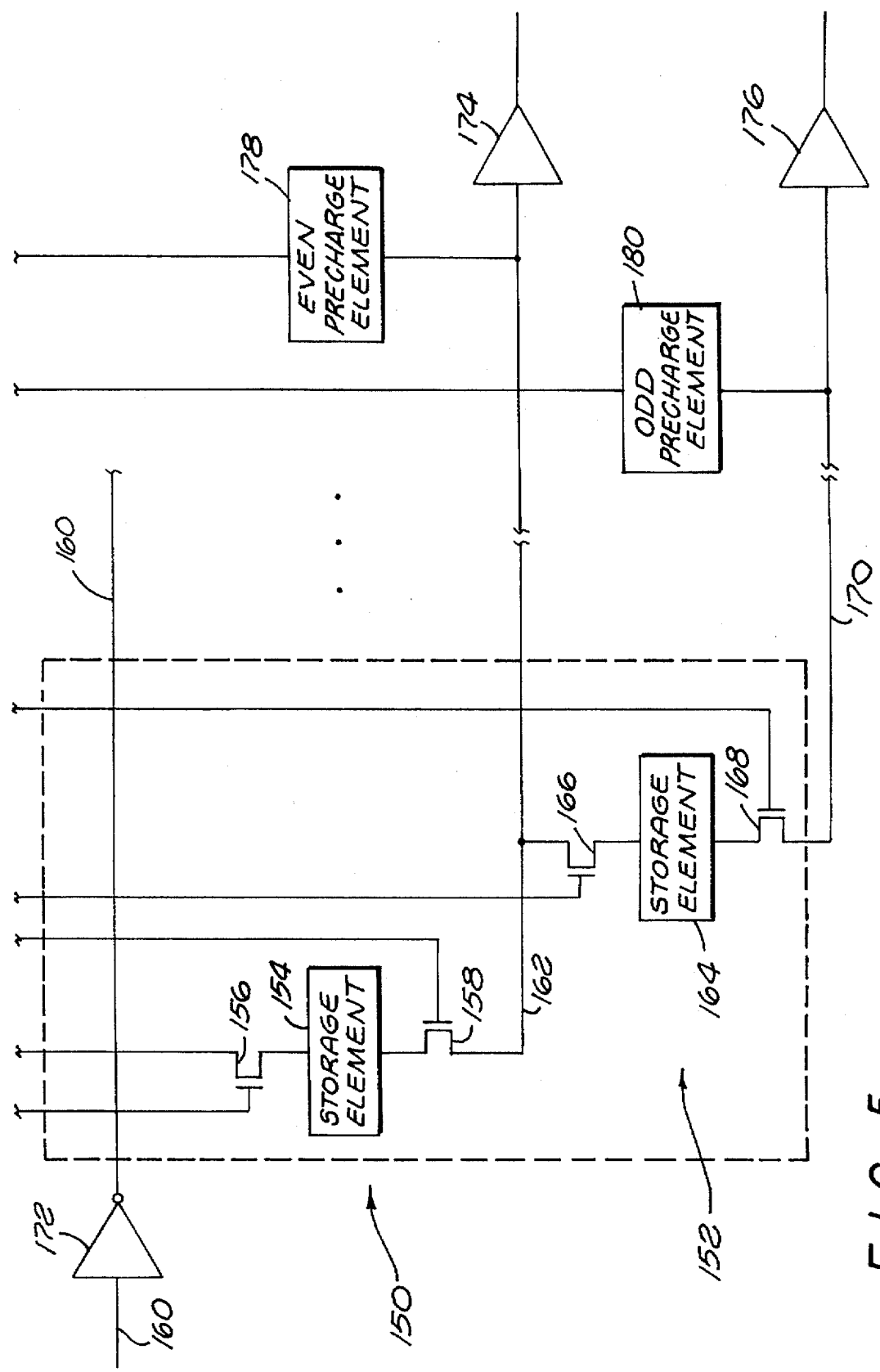
FIG. 5 is a circuit schematic illustrating one row of the FIFO buffer of FIG. 4, including both even and odd storage elements.

FIG. 5 illustrates one row of the odd and even arrays of the split-RAM FIFO of FIG. 4. In particular, FIG. 5 illustrates an even row 150 from even array 102 (FIG. 4) and an odd row 152 from odd array 104 (also FIG. 4). Each of rows 150 and 152 include M/2 storage elements, only one of which is shown in detail for each row. Hence, rows 150 and 152 combined yield M total storage elements.

More specifically, row 150 includes an individual storage element 154 connected in series with a write pass transistor 156 and read pass transistor 158 between an input or write line 160 and an output or read line 162. Likewise, row 152 includes a storage element 164 connected in series between a pair of pass transistors 166 and 168. Pass transistor 166 of storage element 164 is connected to input line 160. However, pass transistor 168 is connected to a separate output or write line 170. Hence, the even and odd rows of storage locations are connected to separate even and odd output lines.

Input signals are received along line 160 through a large inverter 172 of sufficient size to drive signals onto line 160 which is connected to all M storage locations of both even row 150 and odd row 152. Output lines 162 and 170 each include a separate sense amplifier, 174 and 176, respectively. Also, separate precharge elements 178 and 180 are connected to output lines 162 and 170, respectively. The precharge elements will be described in further detail below.

Gates of the read transistors 156 and 166 are connected to output lines of read pointer matrix 110 (FIG. 4). Likewise, gates of write transistors 158 and 168 are connected to output lines of write pointer matrix 106 (also FIG. 4). In use, during each clock cycle, an input signal is received along line 160 and an output signal is driven along either line 162 or line 170 while the other of the two output lines is precharged. Accordingly, one of the write transistors of either the even or odd row is enabled to receive the input signal along line 160. Likewise, one of the read transistors of the output line precharged during the previous clock cycle is enabled for outputting the data signal stored within the corresponding storage location. Precharge elements 178 and 180 are connected directly to the read pointer matrix 110 (FIG. 4) for receiving a signal specifying which of the precharge elements is to be activated during each clock cycle.

By alternatingly precharging either the even row or the odd row, while reading data out from the row precharged during the previous clock cycle, the circuitry allows the doubled clock rate discussed above.

As illustrated in FIG. 5, only a single sense amplifier is connected to the storage locations of the even row and of the odd row, respectively. In the exemplary embodiment, each sense amplifier is a skewed trip point CMOS inverter configured to detect a slight drop in the voltage along the corresponding output line caused by activation of one of the read transistors. By employing a skewed trip point inverter, the output signal is detected promptly thereby allowing the read pass transistor of the corresponding storage location to immediately begin to pull down, if necessary, the line such that the output voltage line is low prior to outputting of a data signal from another one of the storage locations on a subsequent clock cycle.

Hence, FIG. 5 illustrates a circuit for allowing a data signal to be output from either the even row or the odd row during each clock cycle while the other row is precharged. Of course, such assumes that the data to be read from the array alternates between the even and odd rows. In some circumstances other than a FIFO, however, data signals may need to be read from the even row successively or from the odd row successively. If such is the case, then a one clock cycle delay will occur between each successive output to allow the corresponding output line to be precharged. However, data to be stored in a circular FIFO is output in an even/odd interleaved manner and therefore no such delay is encountered.

Figure 6:
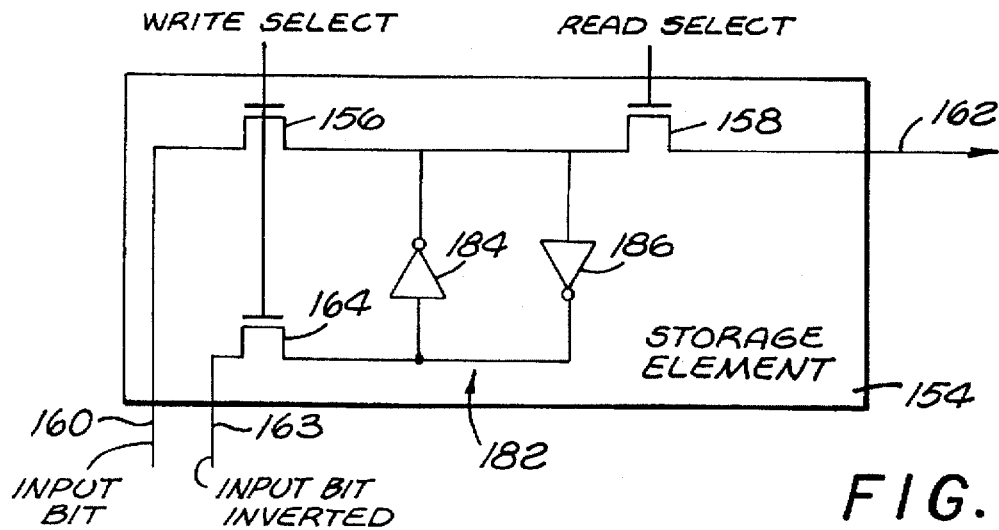
FIG. 6 is a circuit schematic of one of the individual storage locations of the circuit arrangement of FIG. 5.

FIG. 6 illustrates an exemplary implementation of one of the storage locations 154 of the even row shown with the pass write and read transistors 156 and 158, respectively. As can be seen, the storage location includes a latch 182 having a pair of cross coupled inverters 184 and 186. Transistors 156 and 158 are connected in series between input line 160 and output line 162. An additional input line 163, connected to an additional pass transistor 164, also provides the input signal, but inverted. The inverted input line 163 is not separately shown in FIG. 5. The elements of the storage location of FIG. 6 operate in the manner of otherwise conventional latch storage locations and will not be described in further detail. This is commonly called a 7T SRAM.

Figure 7:
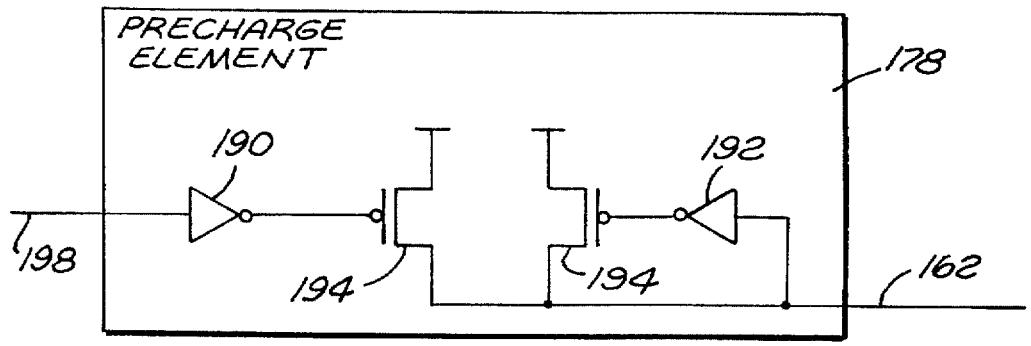
FIG. 7 is a circuit schematic of one of the individual precharge elements of the circuit arrangement of FIG. 5.

FIG. 7 illustrates an exemplary implementation of one precharge element 178 of FIG. 5. Precharge element 180 may be similar. The precharge element includes a pair of inverters 190 and 192 and a pair of pull-up transistors 194 and 196, interconnected as shown. A precharge signal is received along precharge line 198, which is connected to read pointer matrix 110 (FIG. 4). An output of the precharge element is connected to either output line 162 or 170. The precharge element operates in the same manner as otherwise conventional precharge elements and will not be described in further detail herein.

Figure 8:
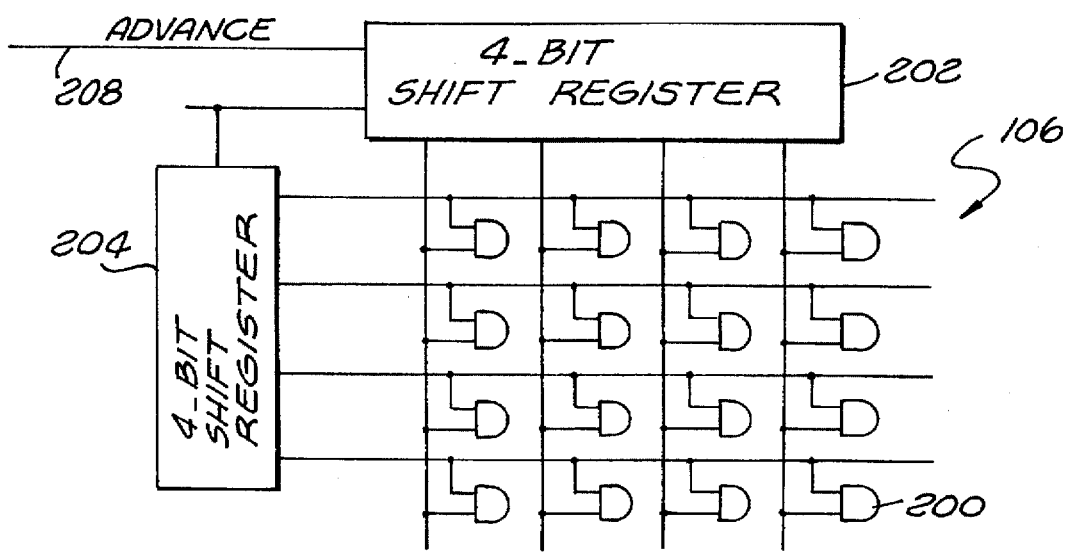
FIG. 8 is a circuit schematic of a matrix array pointer circuit of the FIFO buffer of FIG. 4.

FIG. 8 illustrates an exemplary implementation of write pointer matrix 106 of FIG. 4. Read pointer matrix 110 of FIG. 4 is similar or identical and will not be separately illustrated and described. Write pointer matrix 106 includes a matrix of individual selection gates 200 and a pair of shift registers 202 and 204. In the embodiment illustrated, a total of sixteen gates 200 are provided in a four by four matrix. Shift registers 202 and 204 are both 4-bit one-hot shift registers. Each of the individual gates 200 is a 2-input AND gate having one input connected to an output of shift register 202 and another input connected to an output of shift register 204. With this configuration, during each clock cycle, only one of the gates 200 is enabled by receiving high signals on both input lines. Accordingly, only one of the gates outputs a high signal, which activates one of the storage locations of even row 150 or odd row 152 (FIG. 5).

Shift register 204 represents the most significant bits and shift register 202 represents the least significant bits. Accordingly, shift register 202 shift four times for every single shift of register 204. The two shift registers are interconnected by a signal line 206 which triggers register 204 to shift once after register 202 has shifted four times. Shift register 202 also receives an advance signal along an input line 208 indicating whether to shift, or advance, during the corresponding clock cycle. Hence, the shift registers need not shift during every clock cycle but only shift when needed. If no input data is available, the shift registers do not shift and the array pointer, as represented by output signals from the individual gates, is not advanced.

Figure 9:
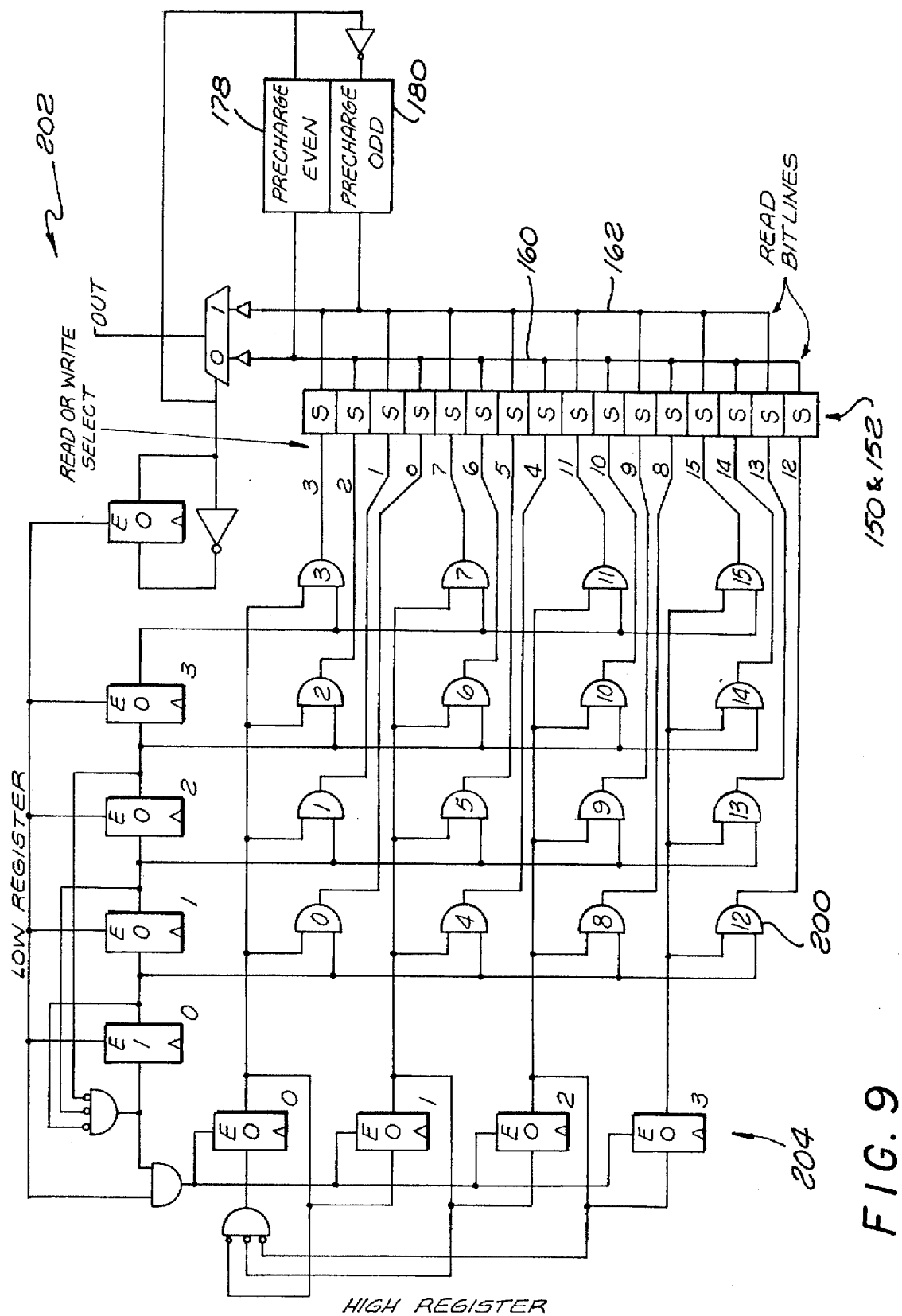
FIG. 9 is a circuit schematic of a specific exemplary embodiment of the FIFO buffer of FIG. 4, particularly illustrating the interconnection of elements of the matrix pointer array and the even and odd storage elements of one row of the RAM array.

The pointer matrix of FIG. 8 is shown in greater detail in FIG. 9 along with one row of storage locations, output lines, precharge elements, and sense amplifiers. The circuit of FIG. 9 operates in the manner as described above with reference to the individual components of the circuit. Accordingly, the circuit will not be further be described.

Figure 10:
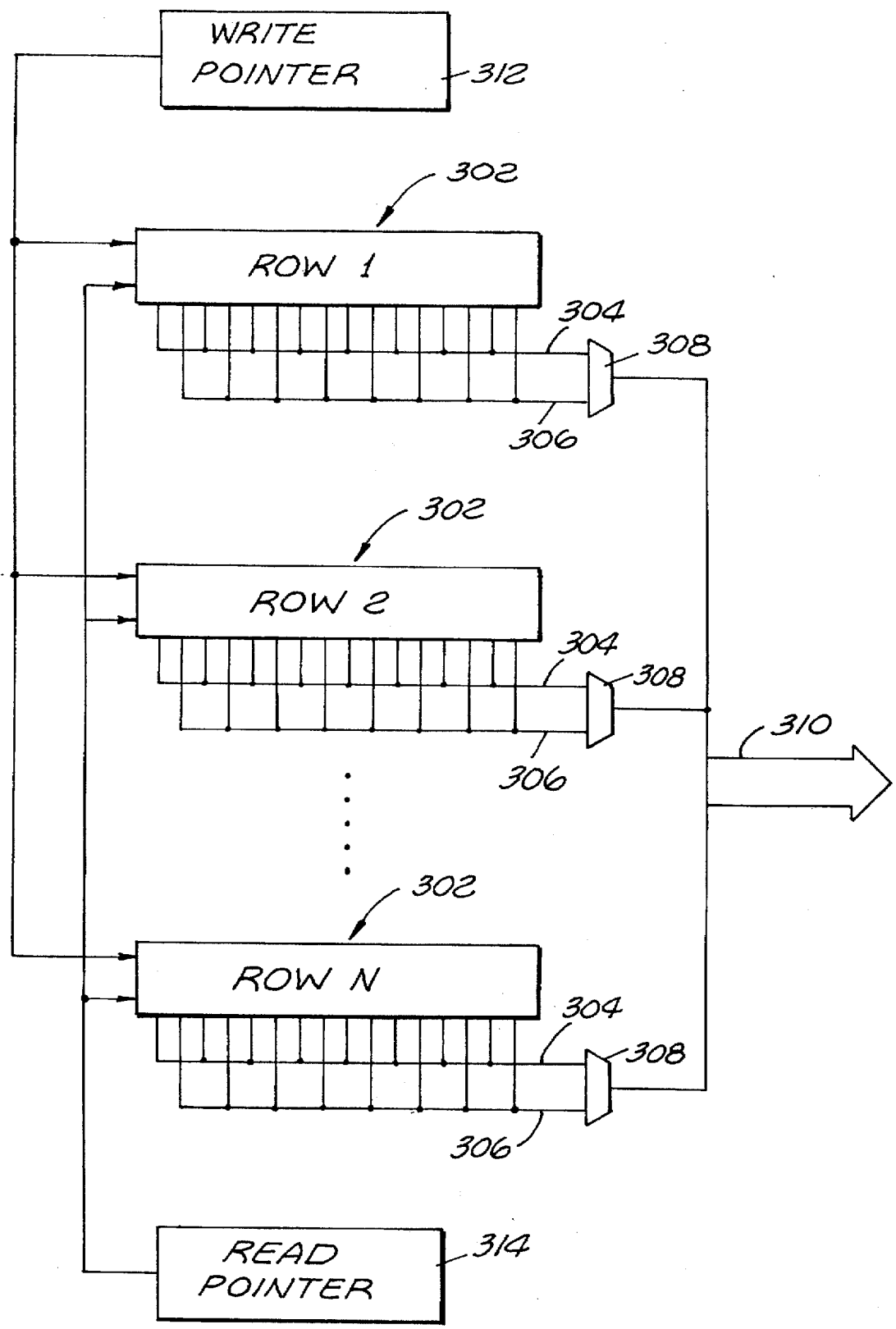
FIG. 10 is a block diagram illustrating a second exemplary embodiment of the FIFO buffer of the invention, particularly illustrating an arrangement having a set of N rows of storage arrays, each having M elements.

What has been described with reference to FIGS. 5-9 is an exemplary implementation of the RAM FIFO of the invention having one row of even and odd storage locations. Practical implementations, however, typically employ N rows, each having separate even and odd storage locations. For example, to store an 8-bit byte of data, the RAM FIFO is configured with eight rows of storage locations. However, only one read pointer matrix and only one write pointer matrix is provided. In other words, during a write operation, an entire column of storage locations is simultaneously activated to store the corresponding bits of an input byte. Likewise, during an output operation, an entire column of storage locations are controlled to output the bits of the corresponding byte. FIG. 10 illustrates a split-RAM FIFO 300 having N rows 302 of storage locations, each having interleaved even and odd storage locations connected to separate output lines 304 and 306, and each having a multiplexer 308 having outputs connected to an N-bit output bus 310. Split-RAM FIFO 300 also includes a single write pointer matrix 312 and a single read pointer matrix 314 connected to each of rows 302 for simultaneously enabling an entire column of storage locations for either a write operation or read operation. Although not separately shown, the split-RAM FIFO of FIG. 10 may also include the bypass path described above for use when a single column of storage locations is to be written to and read from during a single clock cycle.

Figure 11:
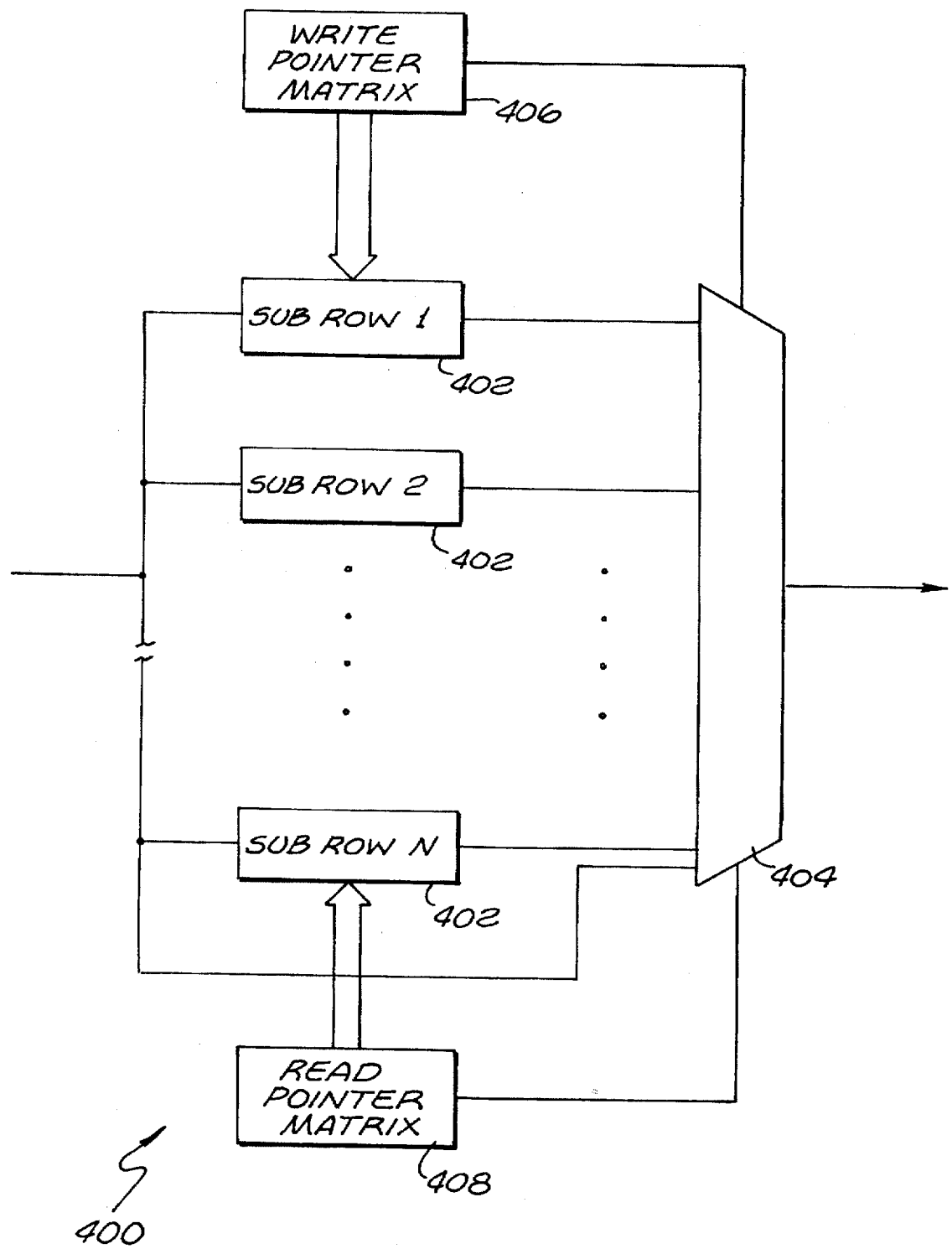
FIG. 11 is a block diagram of a third exemplary embodiment of the invention wherein each individual row of storage elements is split into N sub-rows.

Thus far, all embodiments described employ a split-RAM FIFO wherein each row of the FIFO split into two sub-rows, even and odd. In general, however, each row may be split into N sub-rows. FIG. 11 illustrates a split-RAM FIFO 400 having N sub-rows 402 each connected to an N-input multiplexer 404. Separate write and read pointer matrix arrays 406 and 408, respectively, are also provided.

By employing N sub-rows of storage locations, rather than only even and odd sub-rows, further increases in overall clock rates may be achieved. In use, during any one clock cycle, one of the sub-rows is precharge while data from another sub-row, precharged during the previous clock cycle, is output. Accordingly, the split-RAM FIFO of FIG. 11 may be driven by a clock signal set to have a clock period equal to 1/N of the minimum read time. However, as with previously described embodiment, enhanced throughput of data is only achieved as long as the data is sequentially interleaved. If the data is not sequentially interleaved, then some delay may occur between successive data outputs, particularly if data is to be sequentially output from a single sub-tow of storage locations.

What has been described are various embodiments of a split-RAM FIFO. The exemplary embodiments are provided merely to illustrate principles of the invention and should not be construed as limiting the scope of the invention. In the general, the invention may be implemented in wide range of embodiments, for use within a wide range of systems, and to achieve objects or advantages in addition to those specifically described herein. In one embodiment, the split-RAM FIFO is implemented within integrated circuits configured in accordance with Intel Architecture.

What is claimed is:

1. A first-in/first-out (FIFO) buffer employing random access memory (RAM) comprising:

a split-RAM having at least two separate banks;

FIFO pointer elements connected to said banks, said FIFO pointer elements configured as a matrix including AND gates and shift registers for outputting signals for selecting one element of one of said banks for reading or writing;

precharge elements connected between one element of said FIFO pointer elements and one of at least two output lines, said precharge elements for precharging an element of one of said banks while outputting data from an element of another one of said banks;

sense amplifiers connected between said banks and said one of at least two output lines;

a bypass path, connected between an input line and a multiplexer, said bypass path for bypassing said banks when the data to be read out corresponds to data being read in; and wherein said multiplexer is connected to the outputs of said banks and to said bypass path.

2. The first-in/first-out (FIFO) buffer of claim 1 wherein said separate banks are both dual-port RAMs sharing common write bit lines.

3. The first-in/first-out (FIFO) buffer of claim 1 wherein each of said separate banks includes a plurality of SRAM elements connected to said one of at least two output lines.

4. The first-in/first-out (FIFO) buffer of claim 1 wherein said separate banks include a plurality of storage locations divided into alternating even and odd locations.

5. The first-in/first-out (FIFO) buffer of claim 4 wherein said precharge elements precharge the even storage location while reading data from the odd storage location during a first clock cycle.

6. The first-in/first-out (FIFO) buffer of claim 4 wherein said precharge elements precharge the odd storage location while reading data from the even storage location during a second subsequent clock cycle.

7. The first-in/first-out (FIFO) buffer of claim 1 wherein said sense amplifiers are skewed trip point CMOS inverters.

8. A first-in/first-out (FIFO) storage unit comprising:

a first storage bank for storing even data;

a second storage bank for storing odd data;

a three input multiplexer having a first input connected to an output of said first storage bank, a second input connected to an output of said second storage bank, and a third input connected to an input to both said first and second storage banks, said multiplexer selecting said third input line if data to be written into said FIFO corresponds with data to be read out from said FIFO;

a bypass path connected between the input line and said multiplexer, said bypass path being selected by said multiplexer when data to be written into the FIFO corresponds with data to be read out from said FIFO; and FIFO pointer circuit connected to said first storage bank and said second storage bank, said FIFO pointer circuit configured as a matrix including AND gates and shift registers for outputting signals for selecting one of said storage banks for reading or writing.

9. A first-in/first-out (FIFO) unit comprising:

a first plurality of even storage locations, each storing a single bit of data, each connected through a single inverter to an input line, and each connected through a first sense amplifier to a first output line;

a second plurality of odd storage locations, each storing an individual bit of information, each connected through said single inverter to said single input line and each connected through a second sense amplifier to a second output line;

a multiplexer connected to said first and second output lines;

a bypass path connected from said single input line to said multiplexer, said bypass path being selected by said multiplexer when data to be read from said FIFO corresponds with data being written to said FIFO;

FIFO pointer circuit connected to said first plurality of even storage locations and said second plurality of odd storage locations, said FIFO pointer circuit configured as a matrix including AND gates and shift registers for outputting signals for selecting one of said storage locations for reading or writing;

a first precharge element connected between a high power source and said first output line and a second precharge element connected between said high voltage source and said second output line; and an input selection transistor connected between each of said storage locations and said input line and an output selection transistor connected between each of said storage locations and the respective output line.

10. The first-in/first-out (FIFO) unit of claim 9 wherein said sense amplifiers connected along said first and second output lines are skewed trip point CMOS sense inverters for sensing a drop in voltage along said first and second output lines, respectively, corresponding to a change in data stored within one of said plurality of data storage locations along the respective output channel.

11. The first-in/first-out (FIFO) unit of claim 9 wherein said precharge elements are configured to trigger a precharge of the output lines after a read is completed, if necessary.

12. The first-in/first-out (FIFO) unit of claim 9 further including additional rows of first and second storage locations, providing an N by M array of storage locations.

13. The first-in/first-out (FIFO) unit of claim 9 having N storage columns further including said FIFO pointer circuit for selecting one of said N storage columns, said FIFO pointer circuit including:

a first $\sqrt{N}$-bit shift register;

a second $\sqrt{N}$-bit shift register; and an $\sqrt{N}$ by $\sqrt{N}$ array of AND gates interconnected to said first and second bit shift registers;

wherein output lines from said AND gates of the array are connected to said plurality of data storage locations and $\sqrt{N}$ is an integer.

14. A first-in/first-out (FIFO) storage unit comprising:

a first storage means for storing even data;

a second storage means for storing odd data;

a three input multiplexer means for multiplexing between a first input connected to an output of said first storage means, a second input connected to an output of said second storage means, and a third input connected to an input to both said first and second storage means, said multiplexer means selecting said third input line if data to be written into said FIFO corresponds with data to be read out from said FIFO;

a bypass path connected from the single input line to the multiplexer, said bypass path being selected by said multiplexer when data to be read from said FIFO corresponds with data being written to said FIFO; and FIFO pointer circuit connected to said first storage means and said second storage means, said FIFO pointer circuit configured as a matrix including AND gates and shift registers for outputting signals for selecting one of said storage means for reading or writing.

15. A first-in/first-out (FIFO) unit comprising:

a first plurality of even means for storing data, each for storing a single bit of data, each connected through a single inverter to an input line, and each connected through a first sense amplifier to a first output line;

a second plurality of odd means for storing data, each for storing an individual bit of information, each connected through said single inverter to said single input line and each connected through a second sense output amplifier to a second output line;

a multiplexer means for multiplexing between said first and second output lines;

a bypass means for bypassing, connected from said single input line to said multiplexer means, said bypass means being selected by said multiplexer means when data to be read from said FIFO corresponds with data being written to said FIFO; and FIFO pointer means connected to said first plurality of even means for storing data and said second plurality of odd means for storing data, said FIFO pointer means configured as a matrix including AND gates and shift registers for outputting signals for selecting one of said storage locations for reading or writing.

* * * * *

UNITED STATES PATENT AND TRADEMARK OFFICE
CERTIFICATE OF CORRECTION

PATENT NO.    : 5,699,530
DATED         : December 16, 1997
INVENTOR(S)   : Rust et al.

It is certified that error appears in the above-identified patent and that said Letters Patent is hereby corrected as shown below:

In column 1 at line 62 delete "dock" and insert --clock--

In column 4 at line 48 delete "dock" and insert --clock--

In column 4 at line 60 delete "dock" and insert --clock--

In column 5 at line 6 delete "dock" and insert --clock--

In column 5 at line 44 delete "dock" and insert --clock--

In column 7 at line 63 delete "sub-tow" and insert --sub-row--

Signed and Sealed this

Twenty-fourth Day of March, 1998

Attest:

BRUCE LEHMAN

Attesting Officer     Commissioner of Patents and Trademarks